United States Patent Office 3,462,418
Patented Aug. 19, 1969

3,462,418
PREPARATION OF 1,4-BENZODIAZEPIN-2-ONE-4-OXIDE FROM 2-LOWER ALKOXY-1,4-BENZODIAZEPINE-4-OXIDE
Giles A. Archer, Essex Fells, and Leo Henryk Sternbach, Upper Montclair, N.J., assignors to Hoffmann-La Roche Inc., Nutley, N.J., a corporation of New Jersey
No Drawing. Original application Oct. 29, 1963, Ser. No. 319,673, now Patent No. 3,312,688, dated Apr. 4, 1967. Divided and this application Jan. 30, 1967, Ser. No. 612,344
Int. Cl. C07d 53/06; A61k 27/00
U.S. Cl. 260—239.3       3 Claims

ABSTRACT OF THE DISCLOSURE

Process for preparing 5-phenyl-1,4-benzodiazepin-2-ones from 2-lower alkoxy-1,4-benzodiazepine 4-oxides by hydrolizing the latter under acidic conditions. 5-phenyl-1,4-benzodiazepin-2-ones are muscle relaxants, sedatives and anticonvulsants.

Related application

This application is a division of Ser. No. 319,673, filed Oct. 29, 1963, now U.S. Patent 3,312,688. The benefit of this prior, pending application is hereby claimed.

Brief summary of the invention

More particularly, the invention relates to novel processes for preparing certain end products useful as medicinal agents by virtue of their pharmacological activity. The end products resulting from a performance of the processes disclosed in the subject application can be characterized broadly in a chemical sense as being 5-phenyl-1,4-benzodiazepines.

Detailed description

One group of such end products is of the formula

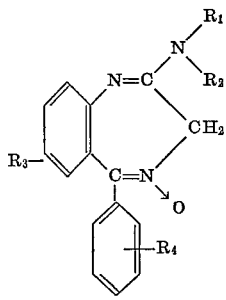

wherein $R_1$ and $R_2$ are each selected from the group consisting of hydrogen, lower alkyl and lower alkenyl and $R_3$ and $R_4$ are each selected from the group consisting of hydrogen, halogen, trifluoromethyl and lower alkyl.

In a preferred aspect, $R_1$ and $R_2$ of Formula I above are selected from the group consisting of hydrogen and methyl. In a still more preferred aspect of the invention, $R_1$ and $R_2$ are either both methyl, or one of $R_1$ and $R_2$ is methyl and the other of $R_1$ and $R_2$ is hydrogen. Advantageously, $R_3$ is chlorine. $R_4$ is preferably selected from the group consisting of hydrogen and halogen and if halogen, the ortho position in the phenyl ring is preferred.

Broadly stated, this aspect of the invention provides a method of making compounds of Formula I above which comprises reacting a compound having the formula of

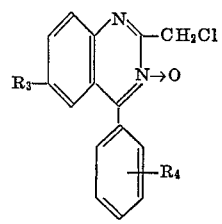

wherein $R_3$ and $R_4$ have the same meaning as ascribed thereto hereinabove with a metal lower alkylate, and subsequently reacting the resulting product which has the formula of

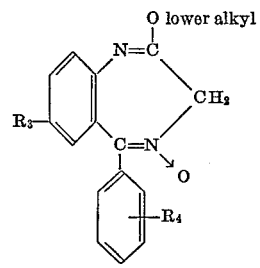

wherein $R_3$ and $R_4$ are as above with a compound having the formula of

wherein $R_1$ and $R_2$ are as above.

The first stage of the process described broadly above, i.e. the preparation of a compound having the Formula III above from a compound having the Formula II above, proceeds efficaciously in the presence of any suitable organic solvent. Representative of such solvents are alcohols such as lower alkanols, e.g. methanol. The metal component of the metal lower alkylate referred to above is preferably selected from the group consisting of alkali metals such as sodium or potassium and alkaline earth metals such as magnesium. Preferred, is an alkali metal lower alkylate, for example, sodium methoxide.

The second stage of the reaction, i.e. the preparation of compounds having the Formula I above from compounds having the Formula III above is advantageously accomplished, with or without isolation of compounds having the Formula III above from the reaction media of the first stage, in the presence of an inert organic solvent which may be a lower alkanol such as methanol and ethanol, dimethylsulfoxide and mixtures thereof. Advantageously, $R_1$ and $R_2$ of the amine of the Formula IV above are selected from the group consisting of hydrogen and methyl. Representative of amines suitable for the purposes of the present invention are methylamine and dimethylamine.

In another embodiment of the present invention, compounds of Formula III above are hydrolyzed, preferably under acidic conditions, to form pharmaceutically valuable compounds of the formula

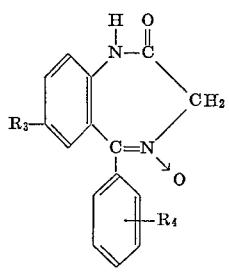

wherein $R_3$ and $R_4$ are as above. Any convenient hydrolyzing system can be employed. However, it is preferred to effect this hydrolysis with an acidic agent such as a mineral acid, e.g. hydrochloric acid, in any suitable solvent medium.

The term "lower alkyl," as used throughout the disclosure, comprehends both straight and branched chain hydrocarbon groups such as methyl, ethyl, n-propyl, isopropyl and the like. The term "halogen," as used throughout the disclosure, is intended to encompass all four forms thereof, i.e. chlorine, bromine, fluorine and iodine. Preferred are chlorine, fluorine and bromine. The term "lower alkenyl" comprehends a group such as allyl, methallyl, propenyl and the like.

Compounds of Formula I are useful as sedatives and anticonvulsants. Compounds of Formula III are useful as chemical intermediates and as muscle relaxants and central nervous system depressants. Compounds of Formula V have utility as chemical intermediates and medicinal agents having anticonvulsant, muscle relaxant and sedative properties.

The foregoing is a general description of a new, novel and useful process for the preparation of pharmaceutically desirable 1,4-benzodiazepines. It will be readily apparent to one skilled in the art that variations of these procedures are possible.

The following examples are illustrative but not limitative of the procedures for the preparation of the said highly desirable 1,4-benzodiazepines. All temperatures stated are in degrees centigrade.

Example 1

Sodium metal (1.4 gm., 0.06 mole) was added to anhydrous methanol (250 ml.), and the mixture was refluxed until the reaction ceased. The solution was cooled to room temperature and treated with 6-chloro-2-chloromethyl-4-phenylquinazoline 3-oxide (6.1 gm., 0.02 mole), which dissolved rapidly. The solution was kept for 22 hours at room temperature, and was then concentrated in vacuo at 25° and diluted with ice water (100 ml.) and saturated sodium chloride solution (200 ml.). The resultant product was extracted with methylene chloride and obtained as a brown gum. This was dissolved in benzene, and the solution was chromatographed over 300×25 mm. column containing 150 gm. of "Woelm" alumina, activity grade III, neutral. The benzene fraction on evaporation gave 7-chloro-2-methoxy-5-phenyl-3H-1,4-benzodiazepine 4-oxide as a yellow foam which, after recrystallization from benzene-hexane, and from methanol, was obtained as pale yellow plates, M.P. 185–187°.

Example 2

7-chloro-2-methoxy-5-phenyl-3H-1,4-benzodiazepine 4-oxide (1.50 gm.) was added to a mixture of absolute ethanol (20 ml.) and dimethylsulfoxide (5 ml.). The resulting mixture was stirred and treated with dry monomethylamine gas which was bubbled through the solution. The mixture was then heated under reflux with continued passage of methylamine until the reaction was complete (4 hours). The mixture was cooled, poured into water and extracted with methylene chloride to give the crude product as a pale yellow crystalline residue. Recrystallization from methylene chloride-hexane gave 7-chloro-2-methylamino-5-phenyl-3H-1,4 - benzodiazepine 4-oxide as pale yellow prisms, M.P. 236–238°.

Example 3

7-chloro-2-methoxy-5-phenyl-3H-1,4-benzodiazepine 4-oxide (0.50 gm.) was added to a mixture of anhydrous ethanol (15 ml.) and dimethylsulfoxide (1.7 ml.), and then treated with a slow stream of dry dimethylamine gas. The mixture was heated under reflux and passage of dimethylamine continued for 8 hours. The starting material dissolved during the reaction. After the reaction was complete, the solution was cooled, poured into water and extracted with methylene chloride to give 7-chloro-2-dimethylamino-5-phenyl-3H-1,4-benzodiazepine 4-oxide as a yellow foam. Recrystallization thereof from methylene chloride-hexane gave yellow prisms, M.P. 198–200°.

Example 4

7-chloro-2-methoxy-5-phenyl-3H-1,4-benzodiazepine 4-oxide (0.5 gm.) was dissolved in ethanol (50 ml.), and diluted with 1 N hydrochloric acid (10 ml.). The solution was stored for 11 days at room temperature and was then diluted with water and neutralized (pH 6–7) with sodium hydroxide solution. The resultant solution was concentrated to remove ethanol. A precipitate which formed was removed by filtration and recrystallized from methanol yielding 7-chloro-1,3-dihydro-5-phenyl-2H-1,4-benzodiazepin-2-one 4-oxide, M.P. 227–230°.

We claim:
1. A process for the preparation of a compound of the formula

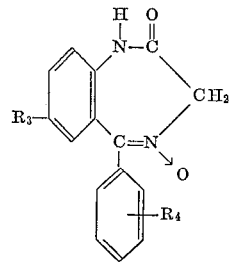

wherein $R_3$ and $R_4$ are selected from the group consisting of hydrogen, halogen, trifluoromethyl and lower alkyl which comprises hydrolyzing under acidic conditions a compound having the formula

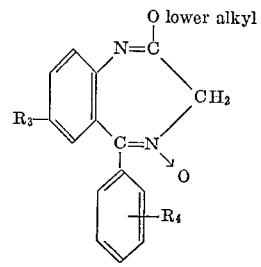

wherein $R_3$ and $R_4$ are as above.

2. A process as defined in claim 1 wherein $R_3$ is halogen and $R_4$ is hydrogen.

3. A process as defined in claim 2 wherein $R_3$ is chlorine.

References Cited

UNITED STATES PATENTS 3,270,053    8/1966    Reeder et al. _____ 260—239.3

HENRY R. JILES, Primary Examiner

R. T. BOND, Assistant Examiner

U.S. Cl. X.R.

260—239; 424—244